UNITED STATES PATENT OFFICE.

RAYMOND VIDAL AND ALCIDE F. POIRRIER, OF PARIS, FRANCE, ASSIGNORS TO SAID VIDAL AND THE SOCIÉTÉ ANONYME DES MATIÈRES COLORANTES ET PRODUITS CHEMIQUES DE ST. DENIS, OF SAME PLACE.

SULFUR DYE.

SPECIFICATION forming part of Letters Patent No. 532,503, dated January 15, 1895.

Application filed June 26, 1894. Serial No. 515,765. (Specimens.) Patented in England December 7, 1893, No. 23,578; in Belgium December 16, 1893, No. 107,691; in Spain February 9, 1894, No. 15,287, and in Austria-Hungary August 21, 1894, No. 10,421.

*To all whom it may concern:*

Be it known that we, RAYMOND VIDAL and ALCIDE F. POIRRIER, citizens of the French Republic, and residents of Paris, France, have invented a new and useful Improvement in the Production of Coloring-Matters, which improvement is fully set forth in the following specification, and has been patented in the following countries: England, No. 23,578, dated December 7, 1893; Belgium, No. 107,691, dated December 16, 1893; Spain, No. 15,287, dated February 9, 1894, and Austria-Hungary, No. 10,421, dated August 21, 1894.

In an application filed June 26, 1894, Serial No. 515,772, is described the production of coloring matters directly dyeing fibers black, blue-black or greenish black, by causing sulfur to react upon doubly substituted derivatives of benzene.

The present invention has for its object the production of coloring matters having the same properties by the re-action of sulfur upon joint amin and phenol derivatives, or on bodies capable of producing them by reduction. We subdivide these bodies under two heads: First, nitrosophenols, or naphthols; and, second, nitrous compounds of phenols or naphthols, and their products of reduction, amido-phenol and amido-naphthol, and the diazoic compounds such as the oxyazobenzene, susceptible of producing by splitting and reduction these amido derivatives of phenol and naphthol.

I. Heat in an iron vessel one part nitroso-alpha-naphthol, .750 part sulfur, and four parts sulfid of sodium. In carrying on this operation the nitroso-alpha-naphthol should be heated for several hours in a concentrated solution of sulfid of sodium and when the temperature reaches 120° to 140° centigrade, and the liquor is absolutely colorless, then the sulfur should be rapidly poured in. The mass should then be stirred vigorously and heating continued until the temperature reaches 190° to 200° centigrade. The product when dried, is ready for dyeing purposes.

The nitroso-alpha-naphthol may be replaced by the nitroso-phenol, nitroso-beta-naphthol, &c.

II. In an open vessel heat one part par-amido-phenol (or more economically the product of the nitration of the phenol mixture of para and ortho), .750 part sulfur, three parts sulfid of sodium, for ten hours at a temperature of from 190° to 200° centigrade.

If, instead of operating upon the amido-phenols, nitro-phenols are used, then it would be necessary to heat preliminarily the nitrated derivatives with a concentrated solution of sodium sulfid, and add the sulfur after complete decoloration of the liquor, and proceed as above described.

The nitro or amido phenols may be replaced by nitro and amido naphthols, azoxybenzene, oxyazobenzene, the nitro-cresols, cresols, &c.

The coloring matters obtained possess the same properties as those described and claimed in the application referred to above. Being embraced in the claim of said application, they are not claimed herein. They are soluble in alkaline solution turning them bottle green. They have great affinity for fiber, and are fixed by exposure to air or by oxidizing agents.

Having thus described our invention, what we claim as new is—

The described process of producing coloring matters dyeing non-mordanted fibers, which process consists in heating with sulfur or a sulfur compound the joint amin and phenol derivatives, as herein set forth.

In testimony whereof we have signed this specification in the presence of two subscribing witnesses.

RAYMOND VIDAL.
ALCIDE F. POIRRIER.

Witnesses:
JULES ARMENGAUD, Jeune,
EDWARD P. MACLEAN.